United States Patent [19]
Borkovitz et al.

[11] 3,999,077
[45] Dec. 21, 1976

[54] RECTIFIER-INVERTER AND LINE VOLTAGE REGULATOR SYSTEM

[75] Inventors: Henry S. Borkovitz, Skokie; Christopher P. Nystrom, Chicago; Robert P. Stirniman, Arlington Heights, all of Ill.

[73] Assignee: Sola Basic Industries, Inc., Milwaukee, Wis.

[22] Filed: June 9, 1975

[21] Appl. No.: 584,919

[52] U.S. Cl. ............................................. 307/66
[51] Int. Cl.$^2$ ........................................ H02J 7/00
[58] Field of Search ............... 307/66, 64, 85, 86, 307/87; 321/4, 18, 27 R; 324/83 R, 87

[56] References Cited
UNITED STATES PATENTS

| | | | |
|---|---|---|---|
| 3,337,743 | 8/1967 | Rolfes | 307/66 |
| 3,348,060 | 10/1967 | Jamieson | 307/66 |

*Primary Examiner*—Herman J. Hohauser
*Attorney, Agent, or Firm*—Smythe & Moore

[57] ABSTRACT

A constant voltage, constant frequency, uninterruptible a.c. power supply having a line voltage regulator, a rectifier-inverter with an emergency battery power supply and a transfer switch for selectively connecting the line voltage regulator and rectifier-inverter to a load. Under normal conditions, the line voltage regulator and rectifier inverter derive their operating power from the power line and are both connected to the load. If the fault detection system detects a power line fault, it causes the transfer switch to disconnect the line voltage regulator from the load and the rectifier-inverter supplies power to the load from the emergency battery power supply. If the fault detection system detects a rectifier-inverter fault, it causes the transfer switch to disconnect the rectifier-inverter from the load. A synchronization control system regulates the phase of the rectifier-inverter.

2 Claims, 1 Drawing Figure

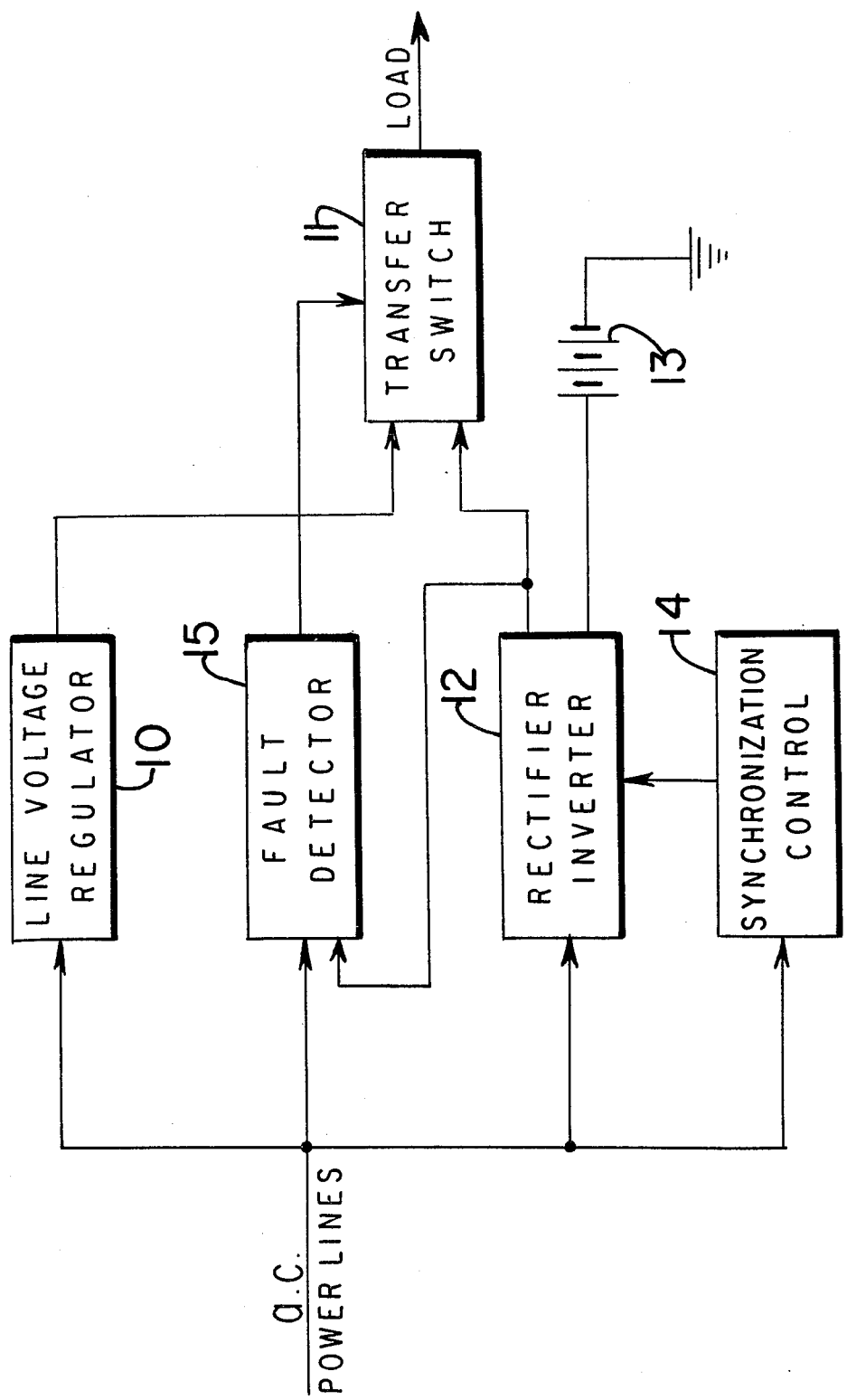

RECTIFIER-INVERTER AND LINE VOLTAGE REGULATOR SYSTEM

This invention relates to an uninterruptible power supply and, more specifically, to a constant voltage, constant frequency, uninterruptible power supply connected to a.c. power lines for supplying a critical load.

Modern, sophisticated computers must have a continuous source of power. If the main power fails, the computer may "dump its memory" unless an emergency power line comes on the circuit. The transfer to the emergency power supply must be instantaneous and the emergency power supply must supply power that is in phase with the main power supply. The voltage from the emergency power supply must be well regulated or the computer will not function properly. Furthermore, since it is not unusual for a computer to draw more than 50 KVA, the power supply system must be efficient to reduce energy costs.

It is an object of the present invention to provide a power supply system which will transfer from the main power system to an emergency power system instantaneously after the main power system fails.

It is another object of the present invention to provide an emergency power supply system with a well regulated voltage.

It is yet another object of the present invention to provide for an efficient power system.

In one aspect of the invention, an uninterruptible rectifier-inverter a.c. power supply is connected in parallel with a regulated power supply to a source of a.c. power and to an a.c. critical load through a solid state transfer switch. Fault detection device means will actuate the transfer switch if power fails to cause batteries connected to the rectifier-inverter to supply power to the load or if the rectifier-inverter has a fault to disconnect it. There is a synchronization control circuit connected to the input power line and the rectifier-inverter so that it will supply power in proper phase relation.

The above and other objects, advantages and features of the invention will become apparent from the following description and drawings which are merely exemplary.

The FIGURE is a block diagram of the present invention.

With reference to the FIGURE, line voltage regulator 10 regulates the a.c. voltage from the a.c. power lines and applies the regulated voltage to a first input terminal of a transfer switch 11. A rectifier-inverter 12 rectifies the a.c. from the a.c. power lines to power the inverter circuit and to charge emergency power supply batteries 13. The inverter converts the d.c. from the rectifier or emergency batteries 13 to a.c. and applies the a.c. to a second terminal of the transfer switch 11. The a.c. output from the rectifier-inverter 12 is kept in phase with the a.c. power line by a synchronization control 14. A fault detector 15 senses the a.c. voltage from the a.c. power lines and senses the a.c. output voltage from the rectifier-inverter 12. When a fault is detected on the a.c. power lines or the rectifier-inverter 12, a signal is applied to the transfer switch 11 by the fault detector 15 to indicate the source of the fault.

In normal operation, the transfer switch 11 connects the a.c. output from both the line voltage regulator 10 and the rectifier-inverter 12 to the load. When the fault detector senses a fault on the a.c. power lines, the transfer switch 11 disconnects the line voltage regulator 10 from the load and the rectifier-inverter 12 uses the emergency battery 13 for power so that it can energize the load. When the fault detector 15 senses a fault with the rectifier-inverter 12, the transfer switch 11 disconnects the rectifier-inverter 12 from the load and the load remains energized by the line voltage regulator 10.

In a typical embodiment, the transfer switch may be a solid state switch which can include silicon controlled rectifier switches or other solid state components for extremely fast switching such that the a.c. power to the load, such as a large computer, is for all practical purposes never interrupted.

It is to be understood that the circuit described herein is simply illustrative of the principles of the invention and that other embodiments and applications are within the spirit and scope of the invention as defined in the appended claims.

What is claimed is:

1. A constant voltage, constant frequency, uninterruptible a.c. power supply connected to an a.c. power line, comprising a transfer switch having first and second input terminals and a load terminal, wherein said transfer switch may selectively connect said first and second input terminals to said output load terminals, a line voltage regulator connected to said a.c. power line and supplying a regulated a.c. voltage to the first input terminal of said transfer switch, a rectifier-inverter connected to the a.c. power line, supplying a regulated a.c. voltage to the second input terminal of said transfer switch, said rectifier-inverter having a battery power supply which is utilized during power line faults, a synchronization control system connected to the power line and to the rectifier-inverter for synchronizing the a.c. output signal from said rectifier-inverter with the a.c. power line signal, and a fault detection system connected to said transfer switch for sensing the fault of the power line or the fault of the rectifier-inverter, wherein said transfer switch normally connects said line voltage regulator and said rectifier-inverter to said load terminals, when said fault detection system detects a fault of the power line, said transfer switch disconnects said first terminal from said load terminal and when said fault detection system detects a fault of said rectifier-inverter, said transfer switch disconnects said second terminal from said load terminal.

2. A constant voltage, constant frequency, uninterruptible power supply connected to an a.c. power line, comprising a line voltage regulator connected to the a.c. power line, a rectifier-inverter connected to the a.c. power line and being synchronized with the power line and having a battery power supply which is utilized when there is an a.c. power line fault, fault detection means for detecting rectifier-inverter faults, and switch means controlled by said fault detection means for connecting said line voltage regulator and said rectifier-inverter to a load and selectively disconnecting said line voltage regulator or said rectifier-inverter from a load when a fault develops in said line voltage regulator or said rectifier-inverter.

* * * * *